(No Model.) 3 Sheets—Sheet 3.
S. B. STEERS.
BALE HEADING AND LIFTING ATTACHMENT FOR PRESSES.
No. 320,719. Patented June 23, 1885.
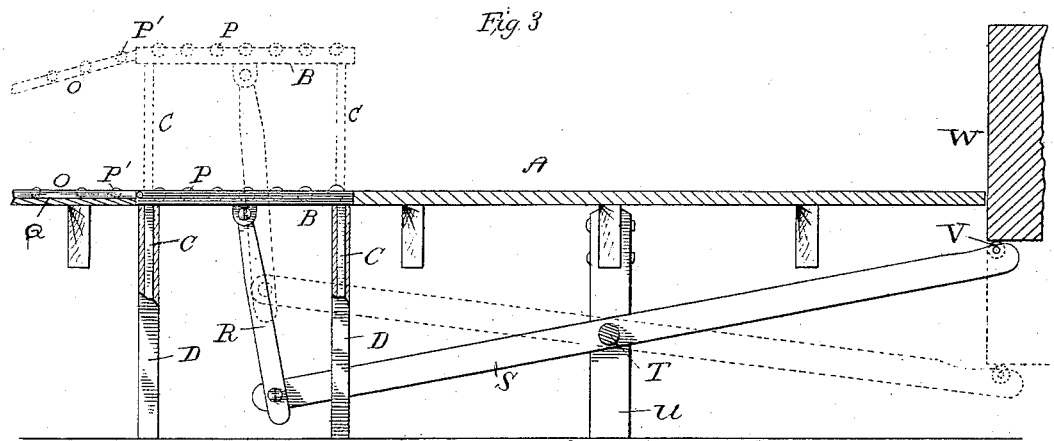
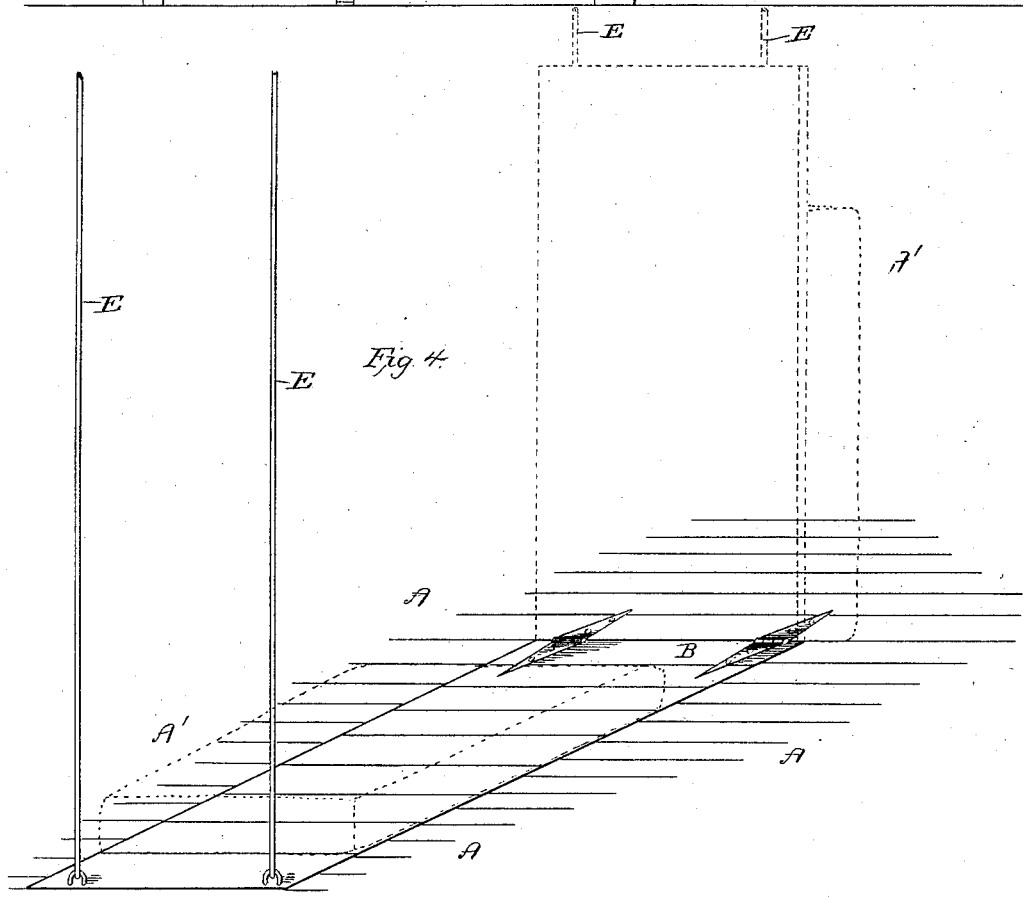
Attest:
Elliott P. Hough
C. E. Jones.
Inventor:
Schuyler B. Steers.
By Chas. J. Gooch
his Attorney

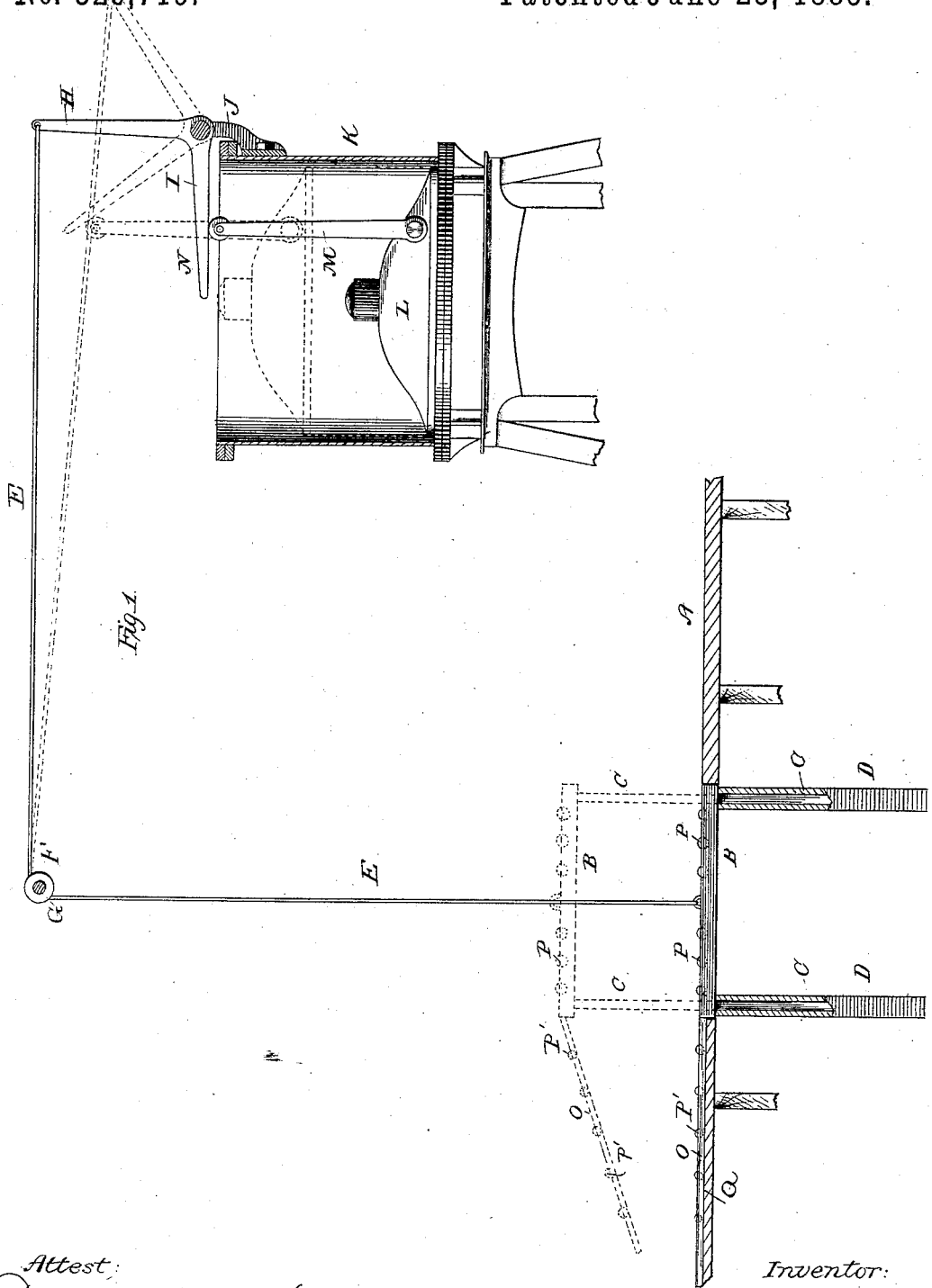

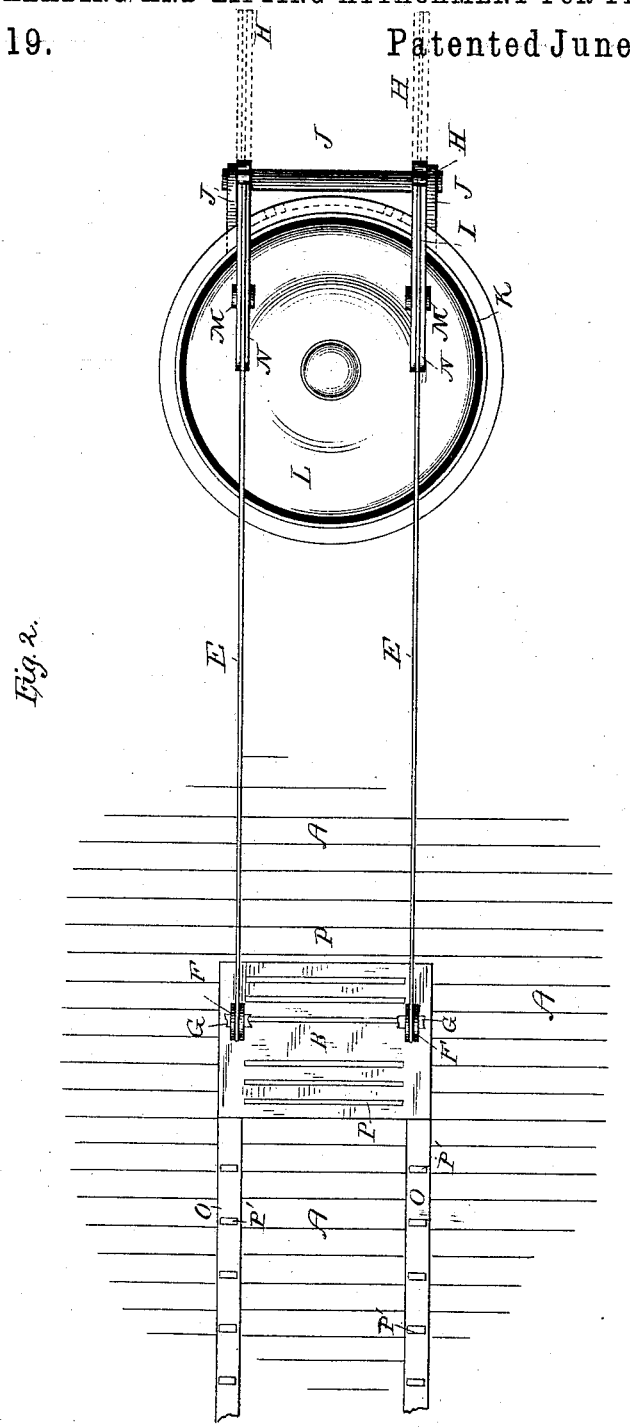

United States Patent Office.

SCHUYLER B. STEERS, OF NEW ORLEANS, LOUISIANA.

BALE HEADING AND LIFTING ATTACHMENT FOR PRESSES.

SPECIFICATION forming part of Letters Patent No. 320,719, dated June 23, 1885.

Application filed May 14, 1885. (No model.)

*To all whom it may concern:*

Be it known that I, SCHUYLER B. STEERS, a citizen of the United States of America, residing at New Orleans, in the parish of Orleans and State of Louisiana, have invented certain new and useful Improvements in Bale Heading and Lifting Attachments for Presses; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to devices for "heading up" bales of cotton, hay, or other material as they are delivered from the press, and for raising and delivering the bales to wagons or drays.

The invention consists in certain improvements on the devices represented in United States patents granted August 7, 1883, to L. C. Terry, No. 282,801, and October 14, 1884, to F. D. Stewart and S. B. Steers, No. 306,659, whereby the heading up of the bale is automatically secured by connecting the front end of a hinged or tilting platform, forming part of or attached to the floor of the building, by means of ropes, chains, or their equivalent, with the piston or other reciprocating portion of the press—such, for instance, as the cog-sectors, lower platen, pins, or links—so as to secure the raising of one end of said platform during the upward movement of that part of the press to which the platform is connected, the raising of a bale to a height to permit of its ready delivery to a wagon being secured by arranging the platform upon or as a part of the flooring and with its edges unattached thereto; in connecting said platform, by means of a lever or levers or chains, or their equivalent, with the piston or other reciprocating portion of the press—such, for instance, as the cog-sectors, lower platen, pins, or links— whereby said platform shall be automatically raised perpendicularly as the press operates; and in providing guideways and guide posts or bars beneath the platform for the purpose of supporting the same while at rest and steadying it in its reciprocatory movements, and in connecting to the platform an inclined way, all as hereinafter set forth.

In the accompanying drawings, Figure 1 represents a side elevation of a portion of a cotton-press with my improvements for raising the bale and conveying the same to a wagon. Fig. 2 represents a top plan view of Fig. 1. Fig. 3 represents a longitudinal section of a portion of the floor with my improved platform, baleway, and the platform operative devices in raised and lowered positions. Fig. 4 represents in section a portion of the floor with the bale heading-up platform and its operative devices.

Of the several ways now in vogue by others by which bales of cotton and other merchandise are headed up and delivered from the press onto a dray none have yet been found in practice to be satisfactory. Where the heading up is accomplished by manual power and where the bale is rolled up skids to a wagon the employment of more help is necessary than when either of my novel attachments to presses is employed; again, where the bale is rolled onto a platform and the platform tilted by the downward movement of the lower platen or other part of the press, so as to head up the bale, it is found that the movement is not as steady or reliable as where the bale lifting and heading devices are operated by the upward movement of the part of the press to which they are attached.

I will first describe my improvements as applied to the raising of bales and their delivery to wagons or drays.

A represents the floor of the building within which the press is situated.

B represents my improved platform for lifting the bales. This platform may either form part of the floor, and, when in position of rest, rest upon customary joists, or it may be formed separate therefrom and rest thereon, as desired, in which latter case it would be necessary to form holes or slots in the floor, through which the parts connected to the under side of the platform, as hereinafter described, can reciprocate. The platform is of a size about six feet long by two and a half feet wide, and is arranged in front of the press with its longest part fronting the same, in order that as the bale A' comes from the press it can be rolled directly upon the platform without necessitating its being turned one quarter around, as would be the case were the end of the platform toward the press-opening.

C C represent posts or bars connected at their upper ends to the under face of the platform, preferably one at each corner thereof, and depending therefrom, as shown, said posts, when the platform is in its lowest position, serving to support the same, and being arranged in guideways D, either depending from the floor or joists or connected thereto or formed independently thereof, as may be found most convenient. The guideways serve to guide and steady the platform in its upward movement and insure its moving perpendicularly.

E represents the platform-lifting lines, ropes, or chains, of which there are usually two, one attached to each end of the platform, so as to leave the broad sides thereof clear for the passage of the bale. These ropes or lines E extend up to and over pulleys or rollers F, journaled in one or more brackets or arms, G, attached to any suitable part of the building— such, for instance, as the roof, side, or cross-beams. The upper ends of these ropes or lines extend to and are attached to the rear arms, H H, of bell-crank levers I, having pivotal bearing within an arm or bracket, J, bolted to the side of the cylinder K of the press.

L represents the piston of the press, to the top of which are connected the lower ends of arms or rods M—one on each side of the piston—which extend upward therefrom, and at their upper ends rest against or are connected by hinge-joints, or otherwise, with the front or inner arms, N, of the bell-crank levers I. Consequently, as the piston L rises, said arms or rods M are forced upward, and they in their turn push upward and rearwardly the front arms, N, and also force rearwardly the rear arms, H, of the bell-crank levers in the manner represented in dotted lines, Fig. 1. As the bell-crank levers are thus forced back the rear arms thereof will pull upon the ropes or lines E and draw them rearward and upward, and thus raise the platform B.

O represents rails or bars hinged or pivoted at their rear ends to the platform, as shown, whereby, when said platform is raised, said bars will rise therewith and assume an inclined position, and thus form an inclined way, down which the bale will readily slide to and be loaded into a wagon for transportation. Said rails may, however, be supported independently of the platform, so as to be set aside when not in use.

The platform is provided with rollers P, journaled therein, to facilitate the passage of the bale from or across the same to the inclined way O, and, if desired, said baleway or bars O may also have rollers, P', journaled therein to assist the passage of the bale therealong to the wagon. When the platform is in its lowest position, the bars either rest upon the floor A or in recesses Q formed therein, which latter may be advantageous, as thereby such bars will lie flush with the floor and avoid the dangerous projection therefrom above the floor. The positions of the several parts while in their lowest or inoperative positions are in the several figures shown in full lines. Their positions when raised or in operative position are shown in dotted lines.

In Fig. 3 of the drawings I have shown another method of raising and lowering my improved platform B and baleway O. In this arrangement, which is an improvement on that shown in the patent to L. C. Terry, heretofore referred to, the bale-lifting platform, its guiding and steadying posts, and inclined way for delivering the bale to a wagon are constructed as above described; but in lieu of connecting the platform to the piston or other reciprocating portion of the press, as above described, I attach to the under side thereof the upper ends of one or more arms or levers, R, whose lower ends are connected to the front end of a lever, S, pivotally attached at T to a post, U, beneath the floor.

V represents a friction-roller in the rear end of the lever S, upon which the lower platen, W, works. In this arrangement W represents the lower and X the upper platen, between which the bales are compressed. A bale having been compressed and discharged from the press and rolled onto the platform B, as the press opens to receive a new bale the lower platen, W, descends and forces the rear end of the lever S down, which, oscillating on its pivot T, will cause the outer end to rise and thus push upward the lever or levers R and the platform B and baleway O, connected thereto, in the manner shown in dotted lines, whereupon the bale can be pushed off the platform and down the bars or way O to the wagon.

In Fig. 4 I have shown my improved arrangement for heading up or raising the bales on end, in order to facilitate their removal from place to place, and thus dispense with the labor of and strain to operatives necessary when bales are headed up by hand. In my present arrangement I dispense with the lever $g$ and bars $h$ and the parts connected therewith, as shown in the Terry patent, above cited, and in lieu thereof arrange the platform with its broad or long side toward the press, and hinge the same at one end to the floor A, so as either to form a portion thereof, or else upon the same, and I then connect to the other end of said platform the lifting ropes or lines E, above referred to, which lines are from thence carried to and over the pulleys F and attached to the bell-cranks I, connected to the piston-cylinder and operated by the piston or other vertically-reciprocating portion of the press in the manner before explained herein with reference to the vertical raising of the platform. As the piston ascends it, through the medium of the rods M, bell-cranks I, and ropes or chains E, raises the hinged platform and heads up the bale in the manner clearly indicated in dotted lines in Fig. 4.

By thus connecting the platforms by means of the lifting-lines E or levers with either the piston or other reciprocating portion of a press—such, for instance, as the cog-sectors, lower platen, pins, or links—as described in the patent granted to myself, above mentioned, I am enabled to raise bales more steadily and evenly than where such raising is accomplished by the downward movement of the press, as the upward motion of the parts is more uniform and steadier than the downward.

By raising the platform with the bale thereon to a height about five feet or more perpendicularly, as I do by my arrangement, and connecting to said platform downwardly-inclined bars, I obtain a down-grade, along which the bales can slide to a waiting wagon, whereupon they can be readily delivered to any part thereof, it being simply necessary to give the bale a slight push off of the platform when so raised onto the inclined way to insure its sliding down the same to the wagon, thus avoiding the exhaustive labor of two or three men, usually necessary when bales are rolled up skids from the floor to the wagon.

Having thus described my invention, what I claim is—

1. In a cotton or other press, the combination, with the piston or other reciprocating portion thereof, of a hinged platform connected to or forming a part of the floor of the building, and chains, ropes, or their equivalent, connecting the free end of said platform and reciprocating portion of the press, substantially as and for the purpose set forth.

2. The combination, with the piston or other reciprocating portion of a cotton or other press, of a platform having a series of rollers journaled in the upper face thereof, and depending guide and steadying bars or posts, and ropes, chains, or a lever or levers connecting said platform and the vertically-reciprocating portion of the press, substantially as and for the purpose set forth.

3. The combination, with the piston or other reciprocating portion of a cotton or other press, of a platform arranged in or resting upon the floor, devices connecting said platform and a reciprocating portion of the press, whereby said platform is automatically reciprocated during the operation of the press, and guide bars or posts depending from the under side of the platform for the purpose of supporting said platform and steadying the same during its reciprocatory movement, substantially as and for the purpose set forth.

4. The combination, with a piston or other reciprocating portion of a cotton or other press, of a platform, devices connecting said platform and the reciprocating portion of the press for the purpose of securing the raising of the platform, and rails or bars extending from the platform to afford ways along which the bales may be slid therefrom to a wagon, substantially as set forth.

5. The combination, with the piston or other reciprocating portion of a press, of a platform arranged in or resting upon the floor, and one or more ropes, chains, or levers, or their equivalents, connecting said platform and vertically-reciprocating portion of the press, substantially as and for the purpose set forth.

6. The combination, with the piston or other reciprocating portion of a press, of a platform arranged in or resting upon the floor, ropes, chains, or levers connecting said platform and reciprocating portion of the press, whereby as said portion of the press reciprocates said platform will be raised and lowered, and an inclined guideway to secure the removal of bales from said platform, substantially as described.

In testimony whereof I affix my signature in presence of two witnesses.

SCHUYLER B. STEERS.

Witnesses:
FRED EYLE,
J. BENDERNANN.